United States Patent
Onuma et al.

(10) Patent No.: US 11,909,341 B2
(45) Date of Patent: Feb. 20, 2024

(54) POWER CONVERSION DEVICE AND METHOD FOR CONTROLLING SAME

(71) Applicant: Hitachi Industrial Equipment Systems Co., Ltd., Tokyo (JP)

(72) Inventors: Yusaku Onuma, Tokyo (JP); Takuya Sugimoto, Tokyo (JP)

(73) Assignee: HITACHI INDUSTRIAL EQUIPMENT SYSTEMS CO., LTD., Tokyo (JP)

(*) Notice: Subject to any disclaimer, the term of this patent is extended or adjusted under 35 U.S.C. 154(b) by 63 days.

(21) Appl. No.: 17/601,450

(22) PCT Filed: Apr. 12, 2019

(86) PCT No.: PCT/JP2019/016059
§ 371 (c)(1),
(2) Date: Oct. 5, 2021

(87) PCT Pub. No.: WO2020/208829
PCT Pub. Date: Oct. 15, 2020

(65) Prior Publication Data
US 2022/0200505 A1 Jun. 23, 2022

(51) Int. Cl.
*H02P 27/08* (2006.01)
*H02M 1/08* (2006.01)
*H02M 7/539* (2006.01)

(52) U.S. Cl.
CPC ............ *H02P 27/08* (2013.01); *H02M 1/083* (2013.01); *H02M 7/539* (2013.01); *H02P 2209/05* (2013.01)

(58) Field of Classification Search
CPC .... H02P 27/08; H02P 2209/05; H02M 1/083; H02M 7/539
See application file for complete search history.

(56) References Cited

U.S. PATENT DOCUMENTS 4,904,919 A * 2/1990 McNaughton .......... H02P 27/08
318/811
5,587,891 A 12/1996 Nakata et al.
(Continued)

FOREIGN PATENT DOCUMENTS

CN 103248247 A 8/2013
EP 1 612 924 A2 1/2006
(Continued)

OTHER PUBLICATIONS

International Search Report of the of PCT/JP2019/016059 dated Jul. 2, 2019.
(Continued)

*Primary Examiner* — Rina I Duda
(74) *Attorney, Agent, or Firm* — Mattingly & Malur, PC

(57) ABSTRACT

An object of the present invention is to provide a power conversion device capable of suppressing an increase in a current flowing through a motor even if a voltage command exceeds the amplitude of a carrier wave. In order to achieve the above object, the power conversion device controls the driving of a motor by converting a DC voltage into a voltage based on a voltage command by an operation of a switching circuit and includes: a modulated wave generator that generates a first modulated wave from the voltage command; and a control signal generator that generates a control signal for controlling the operation of the switching circuit from the first modulated wave and a carrier wave. The modulated wave generator generates a square wave based on a voltage command norm as the first modulated wave.

12 Claims, 3 Drawing Sheets

(56) References Cited

U.S. PATENT DOCUMENTS

| | | | |
|---|---|---|---|
| 5,657,216 A | 8/1997 | Kaura | |
| 6,580,236 B2* | 6/2003 | Mitsuda | H02P 6/10 |
| | | | 318/400.17 |
| 8,471,518 B2* | 6/2013 | Nishiguchi | B60L 50/61 |
| | | | 363/40 |
| 2010/0052583 A1* | 3/2010 | Takamatsu | B60L 50/51 |
| | | | 318/400.09 |
| 2011/0298403 A1* | 12/2011 | Yamamoto | B60L 15/025 |
| | | | 318/400.15 |
| 2012/0173066 A1 | 7/2012 | Yamada et al. | |
| 2013/0193897 A1 | 8/2013 | Iwashita | |
| 2017/0257043 A1 | 9/2017 | Lorilla | |

FOREIGN PATENT DOCUMENTS

| | | |
|---|---|---|
| EP | 2 036 195 A1 | 3/2009 |
| EP | 2 312 743 A1 | 4/2011 |
| EP | 3 021 477 A1 | 5/2016 |
| JP | 10-248262 A | 9/1998 |
| JP | 2012-95412 A | 5/2012 |
| TW | 200929832 A | 7/2009 |
| WO | 2016/092603 A1 | 6/2016 |

OTHER PUBLICATIONS

Written Opinion of the of PCT/JP2019/016059 dated Jul. 2, 2019.
Extended European Search Report received in corresponding European Application No. 19924346.0 dated Oct. 18, 2022.

* cited by examiner

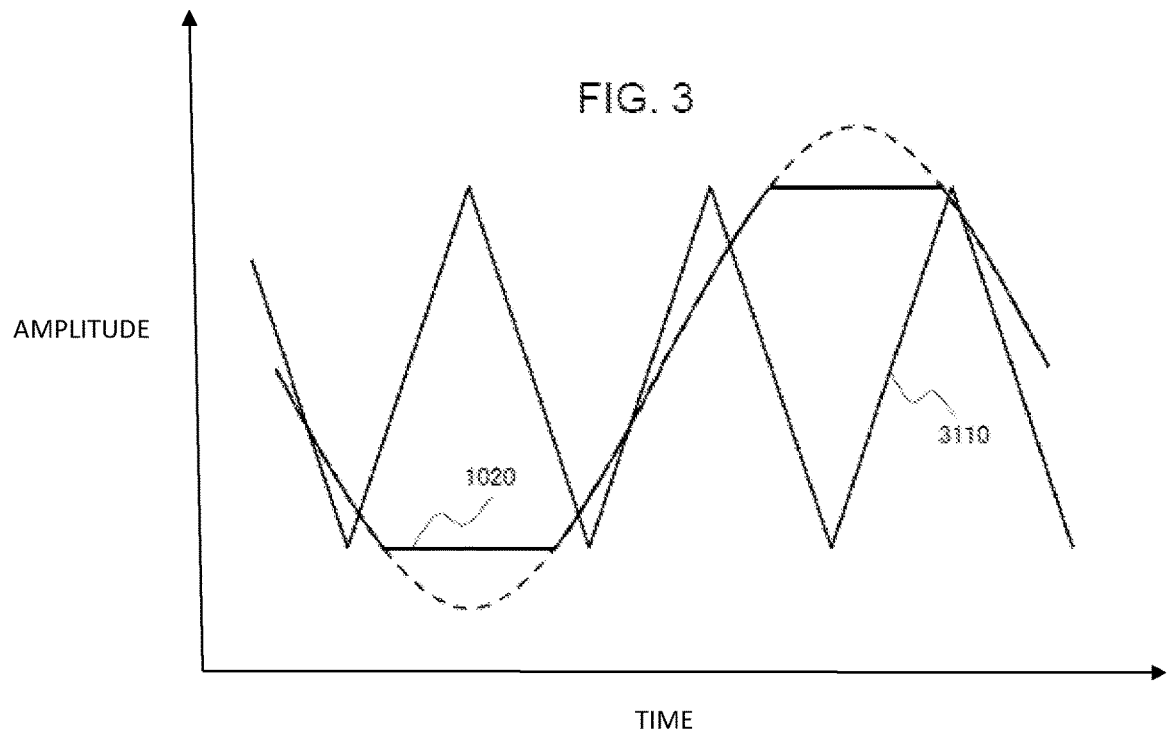
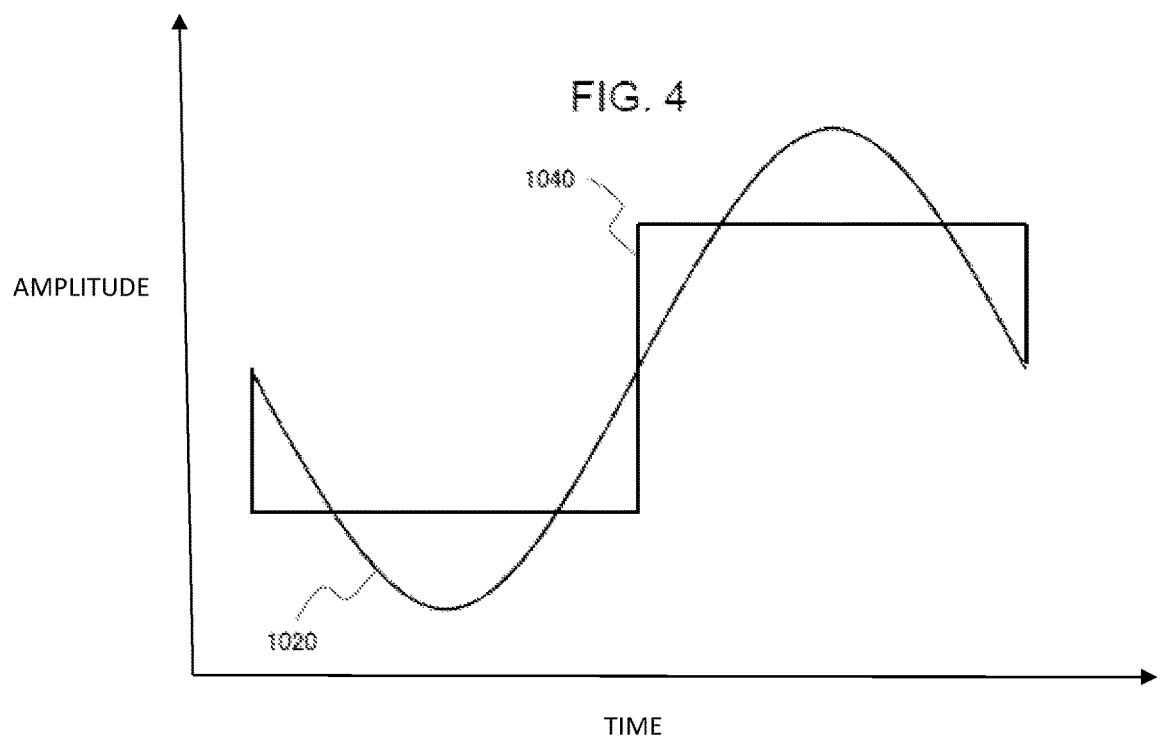

POWER CONVERSION DEVICE AND METHOD FOR CONTROLLING SAME

TECHNICAL FIELD

The present invention relates to a power conversion device.

BACKGROUND ART

As a background art in this technical field, there is JP H10-248262 A (Patent Document 1).

In order to increase a fundamental wave component of an output voltage of a power conversion device with a simple control circuit, Patent Document 1 describes that a comparator for comparing the magnitudes of three-phase voltage commands and calculating an intermediate value excluding the maximum value and the minimum value and an adder for adding a value obtained by multiplying the intermediate value by half to each phase voltage command are provided and the output of the adder is newly used as a voltage command value.

CITATION LIST

Patent Document

Patent Document 1: JP H10-248262 A

SUMMARY OF THE INVENTION

Problems to be Solved by the Invention

In the technique of Patent Document 1, the peak value of the voltage command is reduced and the peak is raised to the fundamental wave component of the phase voltage to increase the fundamental wave component of the output voltage of the power conversion device. However, there is a problem that, when the output of the adder exceeds the amplitude of the carrier wave, the fundamental wave component of the output voltage becomes lower than the fundamental wave component of the voltage command and accordingly the current flowing through the motor increases.

Therefore, it is an object of the present invention to provide a power conversion device capable of suppressing an increase in a current flowing through a motor even if a voltage command exceeds the amplitude of a carrier wave and a control method thereof.

Solutions to Problems

The present invention is, for example, a power conversion device that controls driving of a motor by converting a DC voltage into a voltage based on a voltage command by an operation of a switching circuit. The power conversion device includes: a modulated wave generator that generates a first modulated wave from the voltage command; and a control signal generator that generates a control signal for controlling the operation of the switching circuit from the first modulated wave and a carrier wave. The modulated wave generator generates a square wave based on a voltage command norm as the first modulated wave.

Effects of the Invention

According to the present invention, it is possible to provide a power conversion device capable of suppressing an increase in a current flowing through a motor even if a voltage command exceeds the amplitude of a carrier wave and a control method thereof.

BRIEF DESCRIPTION OF THE DRAWINGS

FIG. 3 is a diagram showing a relationship between a conventional voltage command and a carrier wave.

FIG. 4 is a diagram showing a relationship between a voltage command and a first modulated wave in the first embodiment.

MODE FOR CARRYING OUT THE INVENTION

Hereinafter, embodiments of the present invention will be described with reference to the diagrams. In addition, as a premise of the following explanation, when the reference phase of the three-phase AC currents is a U phase, phases having a phase difference of $\pm 2\pi/3$ rad from the U phase are a V phase and a W phase, respectively, and the sum of the three-phase AC currents is zero, the Euclidean norm (hereinafter, referred to as a norm) of the three-phase AC currents can be calculated by squaring the absolute value of each phase and calculating the square root of the sum of the squared values.

If the sum of the three-phase AC currents is not zero, the norm may be calculated after removing the zero-phase component from each phase. The zero-phase component can be calculated by dividing the sum of the three-phase AC currents by 3. Hereinafter, the three-phase AC currents will refer to those after the removal of zero-phase. In addition, by multiplying the three-phase AC norm (three-phase AC interphase voltage) by $\sqrt{2}/\sqrt{3}$, the result matches the amplitude of the three-phase AC phase voltage. Therefore, in the present embodiment, the absolute value of each phase is squared, a result obtained by multiplying the square root of the sum of the squared values by $\sqrt{2}/\sqrt{3}$ is used as the norm, and the three-phase AC norm and the three-phase AC phase voltage amplitude are treated as the same physical quantity.

First Embodiment

Figure 1:
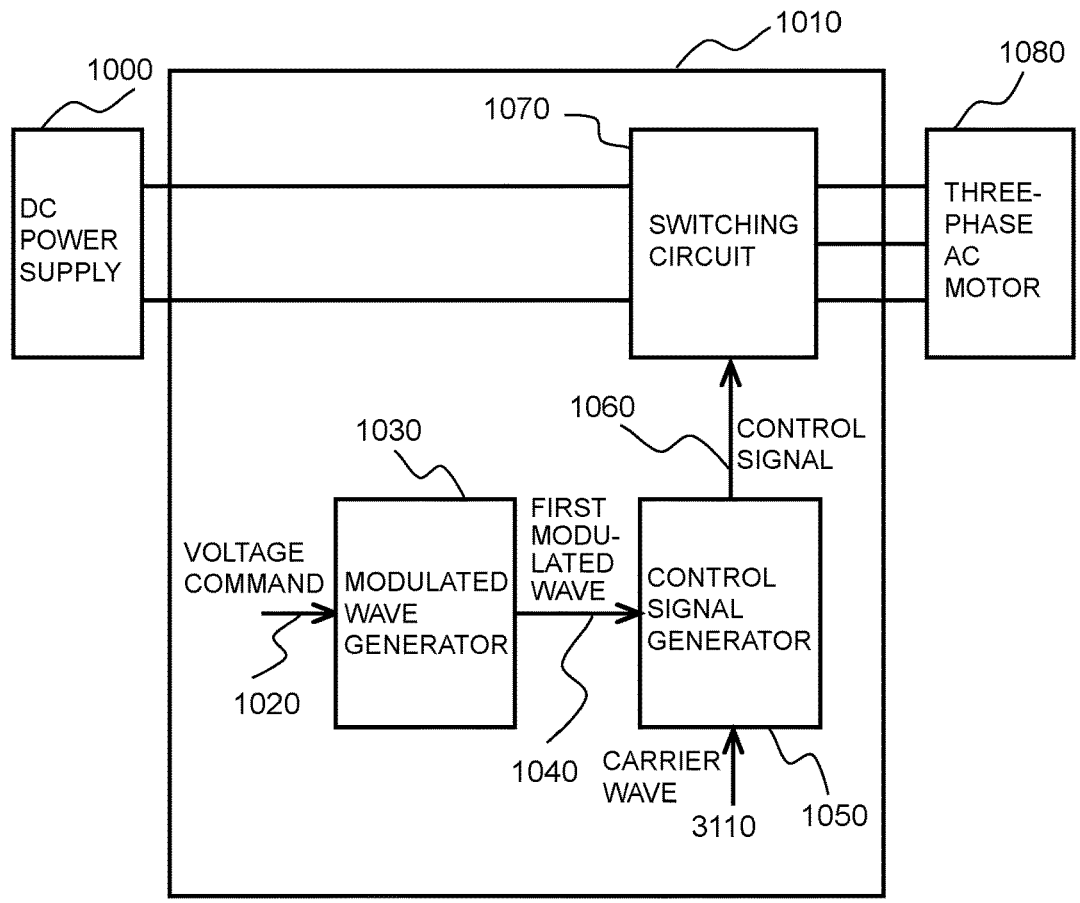
FIG. 1 is a block diagram showing the configuration of a motor driving system according to a first embodiment.

FIG. 1 is a block diagram showing the configuration of a motor driving system according to a first embodiment.

The motor driving system of the present embodiment includes a DC power supply 1000, a power conversion device 1010, and a three-phase AC motor 1080, and the DC power supplied from the DC power supply 1000 is converted into AC power by the power conversion device 1010 to control the driving of the three-phase AC motor 1080.

In FIG. 1, the power conversion device 1010 includes a modulated wave generator 1030, a control signal generator 1050, and a switching circuit 1070.

The modulated wave generator 1030 generates a first modulated wave 1040 based on the norm of a voltage command 1020 (hereinafter, referred to as a voltage command norm).

The control signal generator 1050 generates a control signal 1060 for ON/OFF control of the switching circuit 1070 by comparing the first modulated wave 1040 with a carrier wave 3110. As the carrier wave 3110 of the present embodiment, a triangular wave having a period within the fundamental wave period of the first modulated wave 1040 is used, but a sawtooth wave may be used. In addition, the control signal 1060 is a so-called PWM-modulated signal, and this PWM modulation method is a method well known to those skilled in the art. Therefore, the details of the control signal generator 1050 will be omitted.

The switching circuit 1070 performs ON/OFF switching according to the control signal 1060, and converts the DC voltage output from the DC power supply 1000 into an AC voltage based on the voltage command 1020. In addition, although the DC power supply 1000 is used in the present embodiment, a single-phase or multi-phase AC power supply may be used instead of the DC power supply 1000. In this case, a rectifier circuit and a smoothing circuit are added to the power conversion device 1010, and a DC voltage can be obtained by rectifying the AC voltage output from the AC power supply with the rectifier circuit and smoothing the AC voltage with the smoothing circuit.

As the three-phase AC motor 1080, a three-phase AC induction motor is used in the present embodiment. However, instead of the three-phase AC induction motor, a three-phase AC permanent magnet synchronous motor or a three-phase AC synchronous reluctance motor may be used.

The voltage command 1020 for controlling the driving of the three-phase AC motor 1080 can be obtained by V/f constant control (only in the case of an induction motor), sensorless vector control made by adding a current detector for detecting the current flowing through the three-phase AC motor 1080 to the power conversion device 1010, or vector control made by adding a current detector and a position detector for detecting the rotor position of the three-phase AC motor 1080 to the power conversion device 1010. The current detector detects three-phase AC currents. However, in addition to the method of directly detecting three phases, a method may be used in which two phases are detected from the fact that the sum of the three-phase AC currents is zero and the remaining one phase is found from the two phases. In addition, a shunt resistor may be provided on the positive electrode side or the negative electrode side of the switching circuit 1070, and a three-phase AC current may be obtained from the current flowing through the shunt resistor. In addition, the position detector may detect the rotor speed of the three-phase AC motor 1080 and obtain the rotor position by using the fact that the speed and the position have a calculus relationship.

Figure 2:
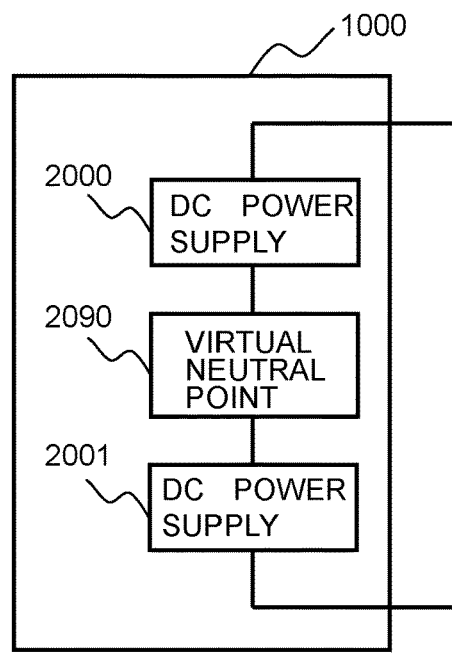
FIG. 2 is a schematic diagram showing the configuration of a DC power supply according to the first embodiment.

Hereinafter, the effects in the present embodiment will be described. For the sake of simplicity, when a virtual neutral point 2090 is introduced into the DC power supply 1000 as shown in FIG. 2, a DC power supply 2000 and the DC power supply 2001 output half the voltage of the DC power supply 1000, and the amplitude of the fundamental wave component of the phase voltage is half the output voltage of the DC power supply 1000.

First, a case where the technique of the present embodiment is not used, that is, a case where the voltage command 1020 is input to the control signal generator 1050 (hereinafter, referred to as a conventional technique) instead of the first modulated wave 1040 will be described.

The control signal generator 1050 compares the voltage command 1020 with a carrier wave and outputs the control signal 1060. However, as shown in FIG. 3, if the amplitude of the voltage command 1020 increases, the voltage command 1020, which should originally be a broken line, is limited by the amplitude of the carrier wave 3110, and the control signal 1060 corresponding to the solid line of the voltage command 1020 is output.

When the modulated wave is a sine (cosine) wave, if the percentage (hereinafter, referred to as a voltage utilization rate) of half the voltage output from the DC power supply 1000 and the voltage command norm exceeds 100%, these are limited by the amplitude of the carrier wave 3110 as described above. Therefore, the output voltage norm (three-phase AC interphase voltage) becomes lower than the voltage command norm. Even when the technique described in Patent Document 1 is used, the output voltage norm (three-phase AC interphase voltage) increases $2/\sqrt{3}$ times that in the case of the conventional technique, so that the voltage utilization rate is $200/\sqrt{3}$%. However, when $200/\sqrt{3}$% is exceeded, the output voltage norm becomes lower than the voltage command norm as described above. Therefore, the current flowing through the three-phase AC motor 1080 increases.

Next, a case where the technique of the present embodiment is used will be described. The modulated wave generator 1030 calculates a voltage command norm and the phase of a voltage command (hereinafter, referred to as voltage phase) from the voltage command, generates a square wave having an amplitude based on the voltage command norm and a phase based on the voltage phase, and outputs the square wave as the first modulated wave 1040.

FIG. 4 is a diagram showing a relationship between a voltage command and a first modulated wave in the present embodiment. As shown in FIG. 4, it is desirable that the phases of the voltage command 1020 and the first modulated wave 1040 are the same. However, this does not apply if a voltage (pulse shape) applied to the three-phase AC motor 1080 is demodulated at the period of the voltage pulse (same as the period of the carrier wave 3110) and the observed voltage is a square wave. The voltage phase can be calculated, for example, by performing coordinate conversion (Clark conversion) of a three-phase AC current into a two-phase AC current and taking an inverse tangent. Since the three-phase AC currents have a phase difference of $\pm 2\sqrt{3}$ rad, a one-phase square wave may be generated, and square waves having a phase difference of $\pm 2\pi/3$ rad may be generated for the remaining two phases. If the voltage command norm and the voltage phase are known in advance, the voltage command norm and the voltage phase may be directly input to the modulated wave generator 1030 instead of the voltage command 1020.

When the amplitude of the square wave generated by the modulated wave generator 1030, that is, the amplitude of the first modulated wave 1040 is ¾ of the voltage command norm, if the voltage utilization rate is within 400/3%, the voltage command norm and the output voltage norm match each other. Therefore, compared with the conventional technique, the voltage utilization rate at which the voltage command norm and the output voltage norm match each other is 4/3 times (=(400/3%)/(100%)).

Compared with the technique of Patent Document 1, the voltage utilization rate at which the voltage command norm and the output voltage norm match each other is $2/\sqrt{3}$ times (=(400/3%)/($200/\sqrt{3}$%)).

In addition, even when the voltage utilization rate is 400/3% or more, it is possible to suppress a decrease in the output voltage norm as compared with the conventional technique and the technique of Patent Document 1.

As described above, by using the technique of the present embodiment, it is possible to suppress an increase in the current flowing through the three-phase AC motor 1080 even if the voltage command 1020 exceeds the amplitude of the carrier wave 3110.

Second Embodiment

Figure 5:
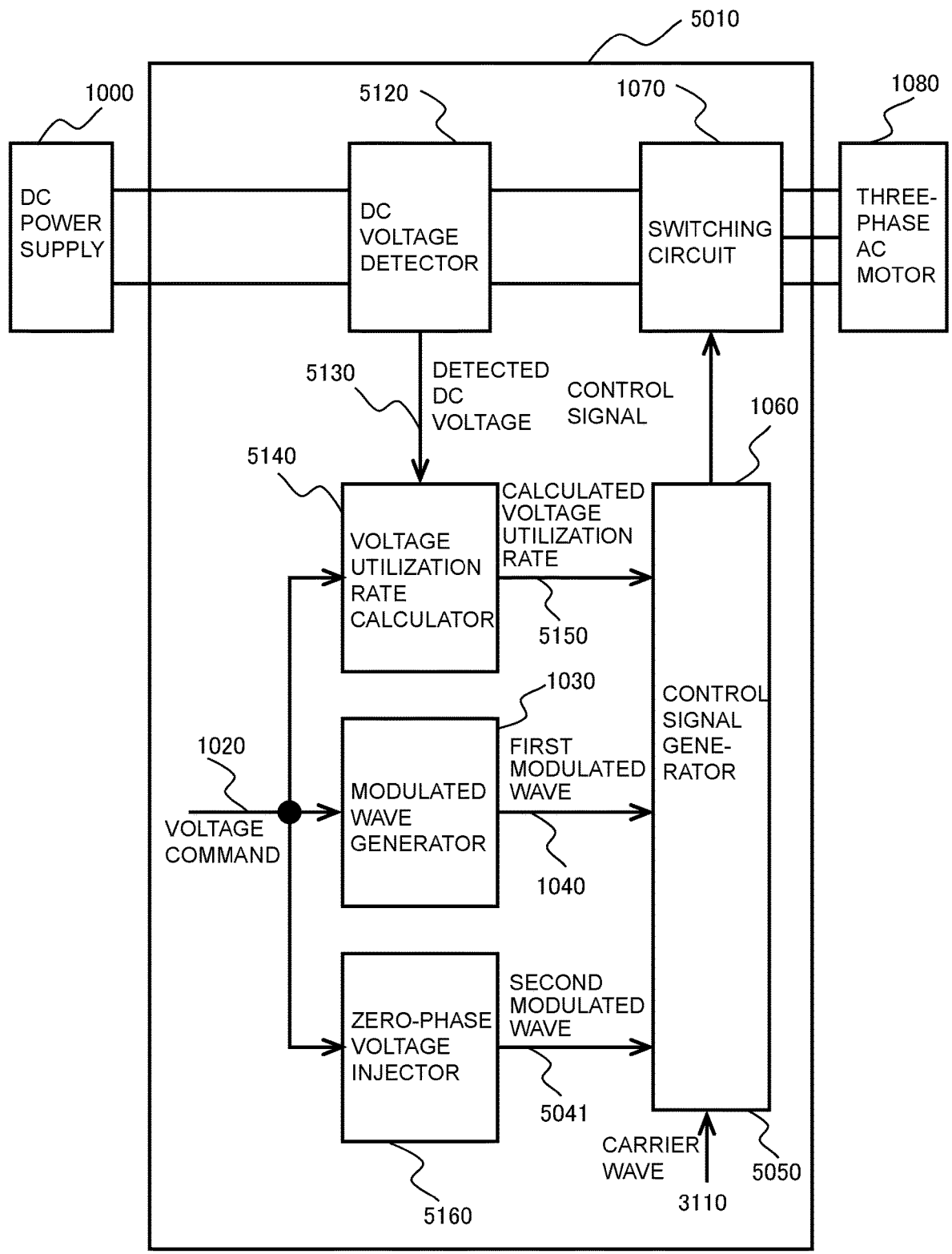
FIG. 5 is a block diagram showing the configuration of a power conversion device according to a second embodiment.

FIG. 5 is a block diagram showing the configuration of a power conversion device according to the present embodiment. In FIG. 5, parts common to those in FIG. 1 are denoted by the same reference numerals, and the description thereof will be omitted.

In FIG. 5, a power conversion device 5010 for controlling the driving of the three-phase AC motor 1080 includes a DC voltage detector 5120, a voltage utilization rate calculator 5140, a modulated wave generator 1030, a zero-phase voltage injector 5160, a control signal generator 5050, and a switching circuit 1070.

The DC voltage detector 5120 detects a DC voltage input to the switching circuit 1070.

The voltage utilization rate calculator 5140 calculates a calculated voltage utilization rate 5150 from the voltage command 1020 and a detected DC voltage 5130. If the voltage command norm is known in advance, the voltage command norm may be directly input to the voltage utilization rate calculator 5140 instead of the voltage command 1020.

The zero-phase voltage injector 5160 injects a zero-phase voltage into the voltage command 1020 and outputs the result as a second modulated wave 5041. Examples of the zero-phase voltage to be injected include "a value obtained by calculating an intermediate value excluding the maximum value and the minimum value and multiplying the intermediate value by half by a comparator that compares the magnitudes of three-phase voltage commands" described in Patent Document 1, the third harmonic of the voltage command 1020, a difference between the maximum phase voltage command value of the voltage command 1020 and half of the detected DC voltage 5130, and a difference between the maximum phase voltage command value of the voltage command 1020 and a value obtained by multiplying half of the detected DC voltage 5130 by −1. However, zero, that is, the voltage command 1020 may be output as it is as the second modulated wave 5041.

The control signal generator 5050 controls switching between the first modulated wave 1040 and the second modulated wave 5041 based on the calculated voltage utilization rate 5150, and generates the control signal 1060 for ON/OFF control of the switching circuit 1070 by comparing the switched modulated wave with the carrier wave. In general, a triangular wave having a period within the fundamental wave period of the switched modulated wave is used as the carrier wave. A sawtooth wave may be used instead of the triangular wave.

Hereinafter, the control of switching between the first modulated wave 1040 and the second modulated wave 5041 based on the calculated voltage utilization rate 5150 will be described.

As described above, if the calculated voltage utilization rate 5150 is within 100% in the conventional technique and within 200/√3% in the technique of Patent Document 1, the voltage command norm and the output voltage norm match each other. Therefore, the second modulated wave 5041 is selected if the calculated voltage utilization rate 5150 is within 100% to 200/√3% and the first modulated wave 1040 is selected if 100% to 200/√3% is exceeded. By comparing the selected modulated wave with the carrier wave, a voltage corresponding to the sine (cosine) wave can be applied to the three-phase AC motor 1080 when the calculated voltage utilization rate 5150 is low while matching the voltage command norm and the output voltage norm.

In addition, in order to prevent discontinuity of the modulated wave when switching between the first modulated wave 1040 and the second modulated wave 5041, when the calculated voltage utilization rate 5150 exceeds 100% to 200/√3%, the first modulated wave 1040 and the second modulated wave 5041 may be transitioned according to the calculated voltage utilization rate 5150. In addition, as described above, if the calculated voltage utilization rate 5150 is within 400/3% by using the technique of the present embodiment, the voltage command norm and the output voltage norm match each other. Therefore, the transition to the first modulated wave may be completed when the calculated voltage utilization rate 5150 is 400/3%.

In addition, the present invention is not limited to the embodiments described above, and includes various modification examples. For example, the above embodiments have been described in detail for easy understanding of the present invention, but the present invention is not necessarily limited to having all the components described above. In addition, some of the components in one embodiment can be replaced with the components in another embodiment, and the components in another embodiment can be added to the components in one embodiment. In addition, for some of the components in each embodiment, addition, removal, and replacement of other components are possible.

In addition, each of the above configurations and functions may be realized by software that interprets and executes a program for realizing each function using a processor, or may be realized by hardware, for example, by designing the configurations and functions with an integrated circuit.

REFERENCE SIGNS LIST

1000 DC power supply
1010 Power conversion device
1020 Voltage command
1030 Modulated wave generator
1040 First modulated wave
1050 Control signal generator
1060 Control signal
1070 Switching circuit
1080 Three-phase AC motor
2000 DC power supply
2001 DC power supply
2090 Virtual neutral point
3110 Carrier wave
5010 Power conversion device
5041 Second modulated wave
5050 Control signal generator
5120 DC voltage detector
5130 Detected DC voltage
5140 Voltage utilization rate calculator
5150 Calculated voltage utilization rate
5160 Zero-phase voltage injector

The invention claimed is:

1. A power conversion device that controls driving of a motor by converting a DC voltage into a voltage based on a voltage command by an operation of a switching circuit, the device comprising:
   a modulated wave generator that generates a first modulated wave from the voltage command;

a control signal generator that generates a control signal for controlling the operation of the switching circuit from the first modulated wave and a carrier wave;

a DC voltage detector that detects the DC voltage;

a voltage utilization rate calculator that calculates a voltage utilization rate from the voltage command norm and the DC voltage; and a zero-phase voltage injector that injects a zero-phase voltage into the voltage command to generate a second modulated wave, wherein the control signal generator controls switching between the first modulated wave and the second modulated wave based on the voltage utilization rate calculated by the voltage utilization rate calculator, and wherein the modulated wave generator generates a square wave based on a voltage command norm as the first modulated wave.

2. The power conversion device according to claim 1, wherein an amplitude of the square wave generated by the modulated wave generator is ¾ of the voltage command norm.

3. The power conversion device according to claim 1, wherein the control signal generator selects the second modulated wave when the voltage utilization rate is within 100% to 200/√3%, and selects the first modulated wave when the voltage utilization rate exceeds 100% to 200/√3%.

4. The power conversion device according to claim 1, wherein the control signal generator selects the second modulated wave when the voltage utilization rate is within 100% to 200/√3%, and makes a transition from the second modulated wave to the first modulated wave when the voltage utilization rate exceeds 100% to 200/√3%.

5. The power conversion device according to claim 4, wherein the control signal generator performs the transition from the second modulated wave to the first modulated wave according to the voltage utilization rate.

6. The power conversion device according to claim 5, wherein the control signal generator completes the transition from the second modulated wave to the first modulated wave when the voltage utilization rate is 400/3%.

7. A control method of a power conversion device that controls driving of a motor by converting a DC voltage into a voltage based on a voltage command by an operation of a switching circuit, the method comprising:

generating a square wave based on the voltage command, as a first modulated wave, from the voltage command;

generating a control signal for controlling the operation of the switching circuit from the first modulated wave and a carrier wave:

detecting the DC voltage;

calculating a voltage utilization rate from the voltage command and the DC voltage;

injecting a zero-phase voltage into the voltage command to generate a second modulated wave;

selecting the first modulated wave and the second modulated wave based on the voltage utilization rate; and generating a control signal for controlling the operation of the switching circuit from either the selected first modulated wave or the selected second modulated wave and a carrier wave.

8. The control method of a power conversion device according to claim 7, wherein an amplitude of the square wave is ¾ of a voltage command norm.

9. The control method of a power conversion device according to claim 8, wherein the second modulated wave is selected when the voltage utilization rate is within 100% to 200/√3%, and the first modulated wave is selected when the voltage utilization rate exceeds 100% to 200/√3%.

10. The control method of a power conversion device according to claim 8, wherein the second modulated wave is selected when the voltage utilization rate is within 100% to 200/√3%, and a transition from the second modulated wave to the first modulated wave is made when the voltage utilization rate exceeds 100% to 200/√3%.

11. The control method of a power conversion device according to claim 10, wherein the transition from the second modulated wave to the first modulated wave is performed according to the voltage utilization rate.

12. The control method of a power conversion device according to claim 11, wherein the transition from the second modulated wave to the first modulated wave is completed when the voltage utilization rate is 400/3%.

* * * * *